United States Patent [19]

Kasper et al.

[11] Patent Number: 4,556,810
[45] Date of Patent: Dec. 3, 1985

[54] HYSTERESIS MOTOR ROTOR HAVING CYLINDRICAL SHAPE WITH REDUCED WALL THICKNESS OUTSIDE STATOR REGION

[75] Inventors: Horst Kasper, Geilenkirchen; Pritsch Eckhard, Jülich-Koslar, both of Fed. Rep. of Germany

[73] Assignee: Uranit GmbH, Jülich, Fed. Rep. of Germany

[21] Appl. No.: 528,636

[22] Filed: Sep. 1, 1983

[30] Foreign Application Priority Data

Sep. 4, 1982 [DE] Fed. Rep. of Germany ....... 3232914

[51] Int. Cl.⁴ .......................... H02K 1/06; H02K 49/04
[52] U.S. Cl. ..................................... 310/256; 310/105; 310/261
[58] Field of Search ............... 310/256, 105, 157, 266, 310/42, 265

[56] References Cited

U.S. PATENT DOCUMENTS

| | | | |
|---|---|---|---|
| 3,676,723 | 7/1972 | Drucker | 310/157 |
| 4,070,592 | 1/1978 | Snowden et al. | 310/266 |
| 4,469,968 | 9/1984 | Jaeschke | 310/105 |

FOREIGN PATENT DOCUMENTS 5328210 3/1978 Japan ................................... 310/256

Primary Examiner—Peter S. Wong
Assistant Examiner—D. L. Rebsch
Attorney, Agent, or Firm—Spencer & Frank

[57] ABSTRACT

A rotor for use with a hysteresis motor in combination with a centrifuge rotor having a hub. The motor has a stator with an axial length and the motor rotor has a region coextensive with the stator. The motor rotor includes a hollow cylindrical body made of a magnetizable material, having one end firmly connected to the hub, and having a wall with a first thickness in the region that is coextensive with the stator and a second thickness, smaller than the first thickness, which is outside of the region that is coextensive with the stator and which is in the region of the connection of the cylindrical body with the hub. The point of transition from the first thickness to the second thickness of the wall is a predetermined distance from the nearest point of contact of the hub with the cylindrical body so as to increase the magnetic resistance between the hub and the cylindrical body.

4 Claims, 2 Drawing Figures

HYSTERESIS MOTOR ROTOR HAVING CYLINDRICAL SHAPE WITH REDUCED WALL THICKNESS OUTSIDE STATOR REGION

BACKGROUND OF THE INVENTION

The present invention relates to a rotor for use with a hysteresis motor in combination with a centrifuge rotor having a hub, wherein the motor has a stator with an axial length and the motor rotor has a region that is coextensive with the stator.

Rapidly rotating machines are preferably driven by hysteresis motors, which have a number of advantages over conventional motors operating according to either the induction or synchronous principles. These advantages are particularly noticeable in this type of application involving rapidly rotating machinery.

While the stator of a hysteresis motor is designed in the conventional manner, i.e. has either a drum winding or a Gramme ring winding with field displacement effect, the rotor of such a motor must meet special requirements, resulting from the demands for strength with respect to the high centrifugal stresses involved and from the requirement for optimim magnetic characteristics.

Hysteresis motors as they are used to drive rapidly rotating rotors comprise a stator having a conventional three-phase winding and a rotor made of a high-strength magnetic steel, preferably in the form of a hollow cylinder.

If the winding of the stator is fed with a three-phase current, the resulting rotating magnetic field produces, in addition to eddy currents, a steady remagnetization of the rotor. Both these effects take care that the rotor and the machine part coupled thereto are accelerated and finally rotate in synchronism with the stator field. In synchronism, eddy current formation and remagnetization go toward zero. Residual magnetic poles produce a torque in the rotor, in a manner similar to a synchronous machine.

The magnetic characteristics of the rotor steel, as well as the type of connection of the rotor with the machine part to be driven, determine, to a considerable degree, the quality of the motor because the coupling point, and at least parts of the machine to be driven, are made of high-strength, magnetic steel and are disposed in the influential sphere of the rotating stator field.

If, for reasons of strength, the hub of the machine part to be driven is likewise made of ferromagnetic steel, the magnetic field lines of the magnetic poles impressed in the rotor will, to a large extent, be dissipated through the hub during rated operation of the hysteresis motor and are no longer available for interaction with the rotating field of the stator. The result of this is that a lower emf is induced in the stator winding and the power factor and efficiency of the motor take on very unfavorable values.

SUMMARY OF THE INVENTION

It is an object of the present invention to develop a high revolution rotor for a hysteresis motor which is coupled with a machine part to be driven, such that the coupling point has great mechanical strength and is magnetically much better decoupled than known devices of the same category as the present invention.

The above and other objects are accomplished in accordance with the present invention in which a rotor is provided for use with a hysteresis motor in combination with a centrifuge rotor having a hub, wherein the motor has a stator with an axial length and the motor rotor has a region coextensive with the stator. The motor rotor includes a hollow cylindrical body made of a magnetizable material, having one end firmly connected to the hub, and having a wall with a first thickness in the region that is coextensive with the stator and a second thickness, smaller than the first thickness, which is outside of the region that is coextensive with the stator and which is in the region of the connection of the cylindrical body with the hub. The point of transition from the first thickness to the second thickness of the wall is a predetermined distance from the nearest point of contact of the hub with the cylindrical body so as to increase the magnetic resistance between the hub and the cylindrical body.

The advantages realized with the novel arrangement according to the invention are, in particular, that with easily realized measures with respect to structural design, it is possible to substantially magnetically decouple the motor rotor from the machine part it drives with a high rate of rotation.

DESCRIPTION OF THE PREFERRED EMBODIMENTS

Figure 1:
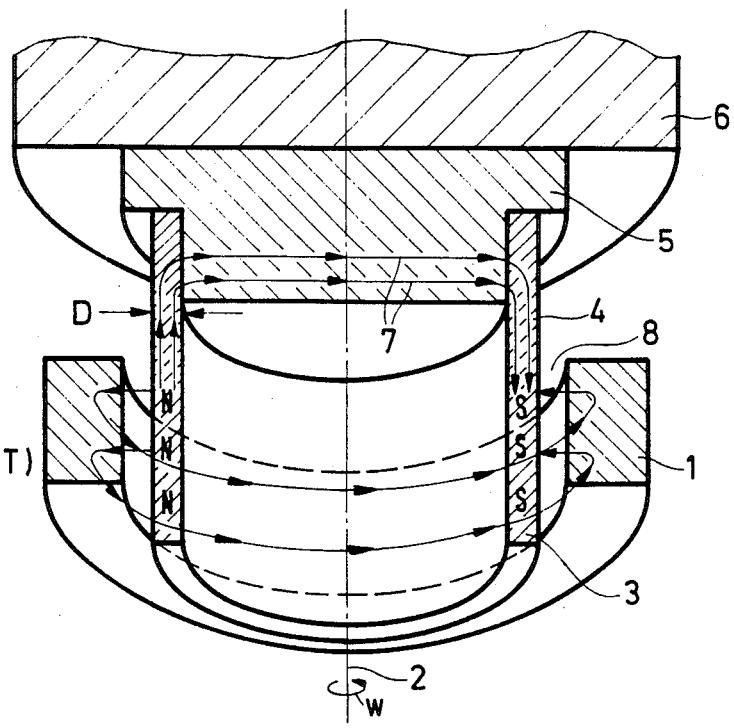
FIG. 1 is a cross-sectional view in the axial direction showing components of a hysteresis motor in combination with a centrifuge rotor according to the prior art.

FIG. 1 is a simplified representation of the prior art in which a stator 1 of a hysteresis motor carries a three-phase winding for generating a rotating field which rotates about an axis 2 at an angular velocity w. The motor includes a rotor 3, having the shape of a hollow cylinder, which is arranged to be coaxial with stator 1 and has a region 4 that projects beyond the top (in FIG. 1) of stator 1 and is connected to a hub 5 of a centrifuge rotor 6. Rotor 3 is either shrink-fitted or welded to hub 5. As illustrated, rotor 3 has a wall thickness D in region 4.

The very small magnetic resistance in region 4 of rotor 3 has the result that a significant portion 7 of the magnetic field lines extends through hub 5 of centrifuge rotor 6 and not, as intended, through air gap 8.

Hub 5, which is made of a ferromagnetic material, is thus magnetically coupled with rotor 3 so that power factor, torque and efficiency of the hysteresis motor lie in an unfavorable range.

Figure 2:
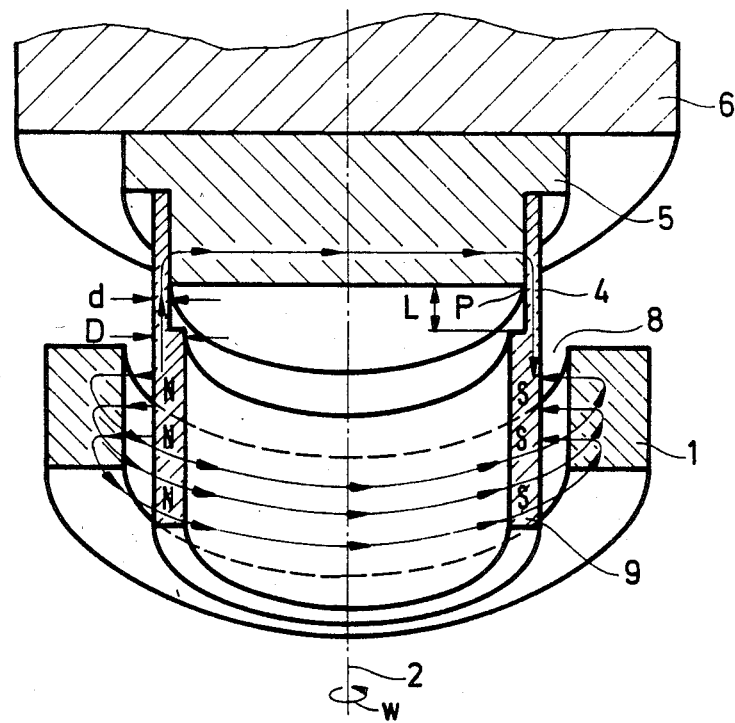
FIG. 2 is a cross-sectional view in the axial direction showing components of a hysteresis motor in combination with a centrifuge rotor according to the invention.

According to the invention as shown in FIG. 2, a rotor 9 of a hysteresis motor has a first wall thickness D and a second, reduced wall thickness d outside the axial length of stator 1 in region 4 of the shrunk or welded seat. The point of transition from the first wall thickness D to the second wall thickness d is at a predetermined axial distance L from the nearest point of contact P of hub 5 with rotor 9.

Wall thickness d may be set by machine-shaping rotor 9, either internally or externally. This permits a certain amount of freedom in the design of the seat and additionally affords an opportunity for optimizing the fit of the seat by correspondingly accurate machining work, to compensate for manufacturing tolerances in rotor 9. It is, however, of importance that rotor 9 in its active region, i.e., in the region of the rotating stator field, retain its original wall thickness D so that the residual magnetic poles can form there to the intended strength. Making the wall thinner, i.e. giving it the wall thickness d, increases the magnetic resistance in region 4 of the shrink-fitted or welded seat to such a degree that few field lines close over the magnetic hub 5, preferring the path to stator 1 almost exclusively over air gap 8. This permits the realization of efficiency and power factors which come very close to the ideal case with complete magnetic insulation of rotor 9. Extensive laboratory tests have fully confirmed these facts, as shown in the table below.

|  | magnetically completely decoupled by nonmagnetic hub | magnetically decoupled by thinning magnetic hub | magnetically coupled, magnetic hub |
| --- | --- | --- | --- |
| power factor | 0.33 | 0.28 | 0.22 |
| standardized torque | 100% | 86% | 58% |
| standardized efficiency | 100% | 99% | 87% |

These results can be obtained by choosing a value of 0.5 or less for the ratio d/D and a distance L of 5 mm or more in FIG. 2.

It will be understood that the above description of the present invention is susceptible to various modifications, changes and adaptations, and the same are intended to be comprehended within the meaning and range of equivalents of the appended claims.

What is claimed is:

1. A motor rotor for use with a hysteresis motor in combination with a centrifuge rotor having a hub for continuously rotating the centrifuge rotor, wherein the motor has a stator with an axial length and the motor rotor has a region coextensive with the stator, said motor rotor comprising: a hollow cylindrical body made of a magnetizable material, having one end directly and firmly connected to said hub and having a wall with a first thickness in said region that is coextensive with the stator and a second thickness, smaller than the first thickness, which is outside of said region that is coextensive with the stator and which is in the region of the connection of said cylindrical body with said hub, the point of transition from the first thickness to the second thickness of said wall being a predetermined distance from the nearest point of contact of said hub with said cylindrical body so as to increase the magnetic resistance between said hub and said cylindrical body.

2. Arrangement according to claim 1, wherein said cylindrical body is welded to said hub.

3. Arrangement according to claim 1, wherein said cylindrical body is shrink fitted to said hub.

4. Arrangement according to claim 1, wherein the point of transition from the first thickness to the second thickness is located beyond the axial length of said stator, between said hub and said stator.

* * * * *